Figure 1:
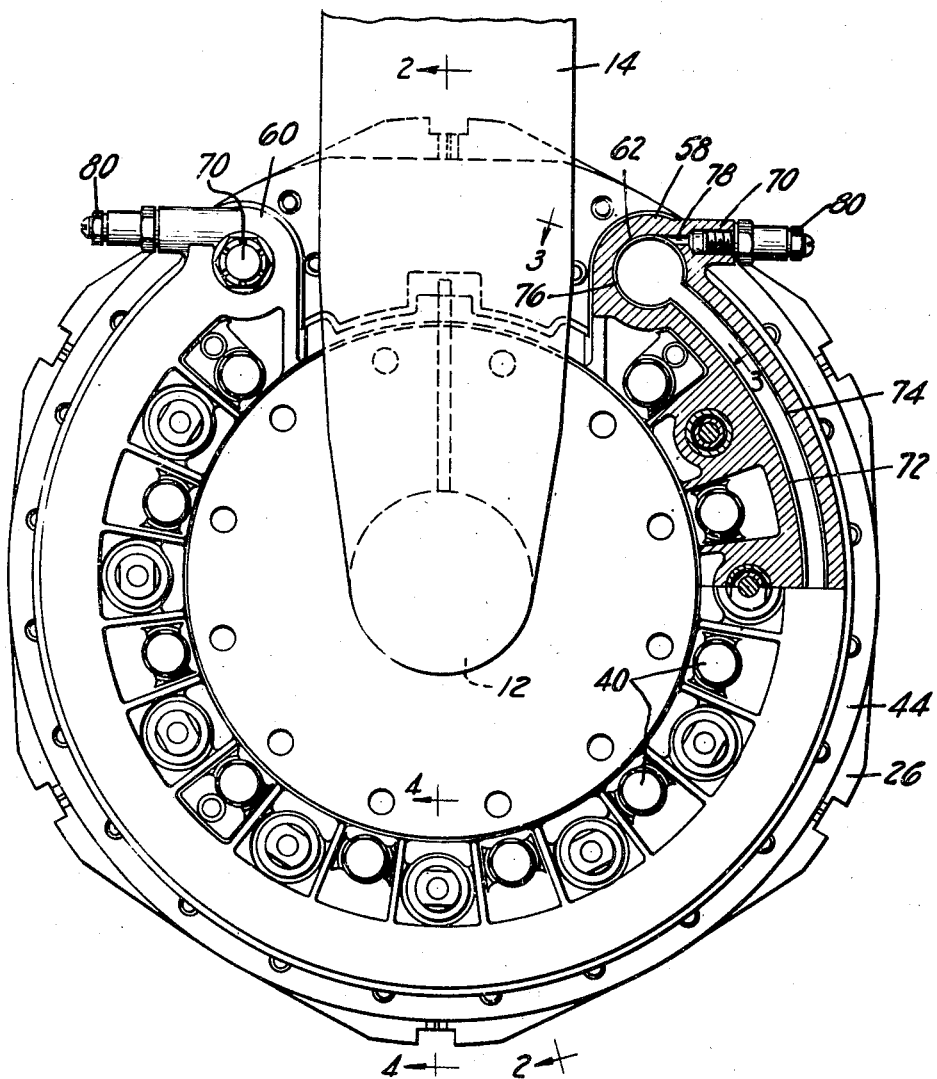

Sept. 27, 1949.      W. H. DU BOIS ET AL      2,483,362
FLUID PRESSURE OPERATED DISK BRAKE FOR AIRCRAFT
Filed Jan. 20, 1945      2 Sheets-Sheet 2
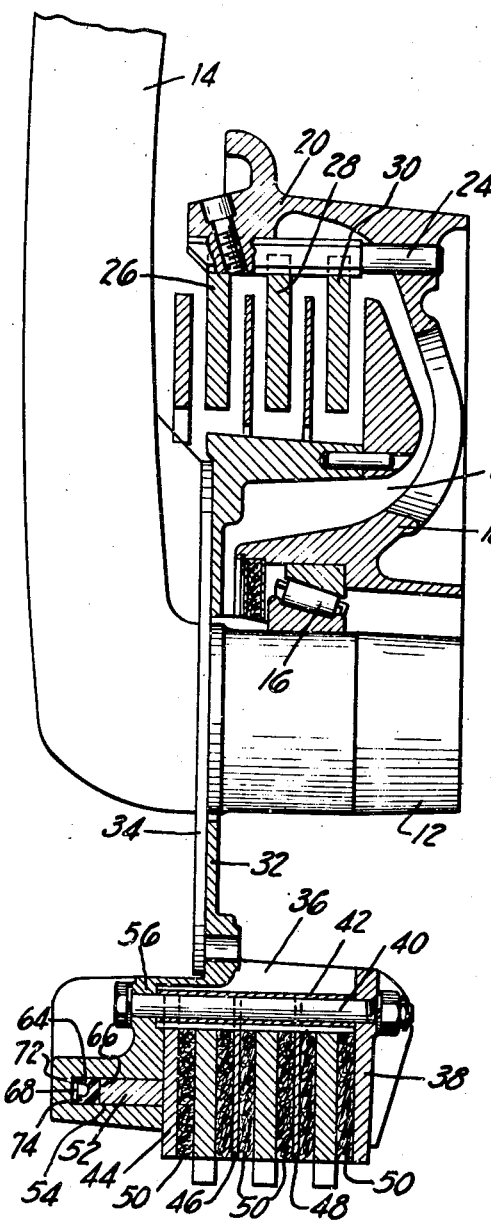
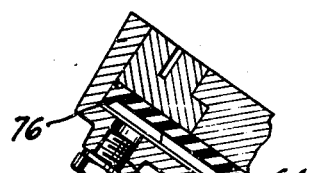
Fig.3
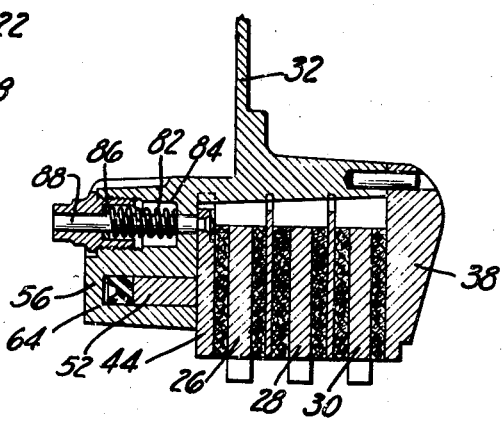
Fig.4
Fig.2
INVENTOR.
IRVING F. CHAPIN
WILLIAM H. DUBOIS
BY
T. J. Plante
ATTORNEY

Patented Sept. 27, 1949

2,483,362

UNITED STATES PATENT OFFICE 2,483,362

FLUID PRESSURE OPERATED DISK BRAKE FOR AIRCRAFT

William H. Du Bois and Irving F. Chapin, South Bend, Ind., assignors to Bendix Aviation Corporation, South Bend, Ind., a corporation of Delaware Continuation of application Serial No. 573,716, January 20, 1945. This application September 14, 1946, Serial No. 697,022

15 Claims. (Cl. 188—152)

This invention relates to brakes which are so constructed and arranged as to be particularly adapted for use with aircraft landing gear. The present application is a continuation of our application Serial No. 573,716, filed January 20, 1945, now abandoned.

Since it is customary to retract the landing gear of airplanes into the wings, planes having unusually thin wing sections pose a particularly difficult problem in the design of landing gear. This applied especially to the brake arrangement, since diminution of the landing gear width decreases the space available for the brake.

An object of the present invention is to provide a brake construction which can be satisfactorily used with a landing gear wherein the lower end of the strut and the wheel are positioned exceptionally close to one another, the brake being located on the inboard side of the wheel.

A more specific object of the present invention is to provide an inboard disk brake having an actuator so arranged and constructed as to permit the wheel to be located in close proximity to the lower end of the strut.

A further object of the present invention is to obtain a cooling flow of air over the friction disks of a disk brake.

Other objects and advantages of the present invention will become apparent during the following description. In the accompanying drawings:

Figure 1 is an end view of a brake as applied to an aircraft landing gear, a portion of the brake being cut away to show the brake actuating means in section;

Figure 2 is a cross section taken on the line 2—2 of Figure 1, except that the strut, axle, and wheel are shown in outline; and Figures 3 and 4 are sections taken on the lines 3—3 and 4—4 respectively of Figure 1.

In the illustrated landing gear, a cantilever axle 12 is supported at the lower end of strut 14. Mounted on bearings 16 for rotation about axle 12 is a wheel 18 having an overhanging rim portion 20 beneath which is a brake cavity 22. Secured to the wheel within the overhanging rim portion 20 are a plurality of driving keys 24 which extend axially through peripheral slots in the rotating disks 26, 28 and 30 to drive the same. The number of rotating disks may be varied according to the requirements of the particular brake installation. The rotating disks 26, 28 and 30 are movable axially along the driving keys 24, thus enabling them to be forced into contact with the cooperating non-rotating disk members of the brake structure.

The non-rotating disk members of the brake are supported on a fixed member 32, said fixed member 32 being secured to a flange 34 on the lower end of strut 14. The member 32 has a plurality of axially extending spokes 36 formed integral therewith, against the outer ends of which a non-rotatable and axially fixed disk 38 is held by means of a plurality of through bolts 40. Sleeves 42 are mounted on the bolts 40 and serve as anchors for three axially movable but non-rotatable disks 44, 46 and 48. Both sides of disks 46 and 48 are lined with friction material 50, as well as the left face of disk 38 and the right face of disk 44 (referring to Figure 2 or 4).

The actuating means for exerting compressive force on the brake disks comprises a plunger or piston member 52 which is movable axially within a chamber 54 provided in a fixed housing 56, which, in the illustrated embodiment of the invention, is formed integral with the brake supporting member 32. It will be noted that, owing to the relatively small space available for the brake structure between the strut 14 and the wheel 18, the rotating and non-rotating friction disks fill substantially the entire brake cavity. The housing 56 in which is mounted the brake actuating plunger member 52 is therefore mounted in the vertical plane of the strut 14 and is discontinued at 58 and 60 to provide an opening through which the strut extends.

The chamber 54 and plunger member 52 therefore are C-shaped, or in other words, they have the form of an annulus except for the space left open at the top of the assembly. At both ends of this incomplete annulus, the chamber 54 and the plunger 52 are provided with enlarged cylindrical end portions, one of which is generally indicated at 62 in the sectioned part of Figure 1. The enlarged cylindrical portions at opposite ends of the chamber 54 serve the important function of positively locating the sealing member 64 which rests against the face 66 of plunger 52 to prevent the escape of liquid past the sides of said plunger, liquid being admitted to the space 68 in chamber 54 through either one of two inlets 70 (two inlets preferably being provided so that identical brakes can be used on either the left or right wheel of the plane). The sealing member 64, which is shown in cross-section in Figures 2, 3 and 4, has an inner lip 72, an outer lip 74, and a circular lip 76 in each cylindrical end portion 62, the lips 76 joining the inner lip 72 to the outer lip 74 to form, in effect, a single continuous lip along the entire sealing surface of chamber 54.

Without the provision of the enlarged end portions 62, any tendency of the sealing member 64 to shrink and thereby shorten its length dimension would tend to uncover the ends of the piston or plunger 52. With the sealing member 64 positively located by means of the enlarged end portions, this possibility is avoided, and satisfactory sealing is insured.

A bleed passage 78 may be located at each end or high point of the chamber 54, the usual bleeder fitting 80 being arranged normally to plug the bleed opening.

A plurality of circumferentially spaced return springs 82 are located in chambers 84 formed in member 32, and are arranged to act through collars 86 and rods 88 to return disk 44 and plunger 52 to released position after each brake application.

In operation, when the brakes are to be applied, fluid under pressure is forced through whichever inlet 70 is connected to the brake line, and into the space 68 at the front of C-shaped chamber 54. The fluid acts against sealing member 64 and the C-shaped plunger 52 to exert an axial pressure tending to move the several disks of the brake into frictional contact with one another, and thereby retard rotation of the wheel 18.

A tremendous amount of heat is generated during the application of brakes on an airplane. For this reason, it is desirable to provide means for cooling the brake disks, particularly those disks which are not lined with friction material, in this case the rotating disks 26, 28 and 30. We are able to obtain an appreciable cooling effect on said rotating disks by discontinuing the lining material on the non-rotating disks at the place where the strut 14 passes between the ends of the brake actuator, or in other words between points 58 and 60. The disks 26, 28 and 30, as they pass through this open space (shown at the top of Figure 2) come into cooling contact with air which is flowing past the wheel, thus dissipating some of the heat which results from the brake application. This arrangement is patricularly suitable in the present case because of the fact that the brake applying pressure of the fluid is not available to act directly on that part of the brake lying between the ends of the C-shaped acuator, and pressure in this interspace is therefore comparatively low. If the non-rotating disks were lined at this point, the lining would tend to wear unevenly because of the lack of uniform pressure around the entire disk.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, the non-rotatable disks being lined with friction material, an axially movable pressure transmitting member arranged to act against said disks, a fixed housing member providing a chamber in which said pressure transmitting member reciprocates, the chamber having an opening to receive fluid under pressure to act against the pressure transmitting member, said fixed housing member being located at least partially in the vertical plane of the lower end of the strut, said pressure transmitting member and the chamber in which it reciprocates having the form of an incomplete annulus provided with an enlarged cylindrical portion at each end, the ends of said incomplete annulus being spaced apart to straddle the strut, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber, said seal having a continuous lip extending along the outer wall of the chamber, around the wall of each enlarged end portion, and along the inner wall of the chamber, the friction material lining being absent from the portion of the otherwise lined disks located between the ends of the pressure transmitting member, thereby permitting a cooling flow of air over the surfaces of the rotating disks at this point.

2. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, an axially movable pressure transmitting member arranged to act against said disks, a fixed housing member providing a chamber in which said pressure transmitting member reciprocates, said fixed housing member being located at least partially in the vertical plane of the lower end of the strut, said pressure transmitting member and the chamber in which it reciprocates having the form of an incomplete annulus provided with an enlarged cylindrical portion at each end, the strut passing through the space between the ends of said incomplete annulus, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber, said seal having a continuous lip extending along the outer wall of the chamber, around the wall of the respective enlarged end portion, and along the inner wall of the chamber.

3. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, an axially movable pressure transmitting member arranged to act against said disks, a fixed housing member providing a chamber in which said pressure transmitting member reciprocates, said fixed housing member being located at least partially in the vertical plane of the lower end of the strut, said pressure transmitting member and the chamber in which it reciprocates having the form of an incomplete annulus provided with an enlarged cylindrical portion at each end, the strut passing through the space between the ends of said incomplete annulus, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber.

4. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, an axially movable pressure transmitting member arranged to act against said disks, and a fixed housing member providing a chamber in which said pressure transmitting member reciprocates, said fixed housing member being located at least partially in the vertical plane of the lower end of the strut, said pressure transmitting member and the chamber in which it reciprocates having the form of an incomplete annulus provided with an enlarged cylindrical portion at each end, the ends of said incomplete annulus being spaced apart to straddle the strut.

5. In an aircraft landing gear including a substantially upright strut, a horizontally extending axle supported at the lower end of said strut, a wheel mounted on said axle at one side of the strut, and a disk brake mounted on the inboard side of the wheel, actuating means for said brake comprising an axially movable pressure transmitting member, and a fixed housing member located at least partially in the vertical plane of the lower end of the strut and providing a chamber in which said pressure transmitting member reciprocates, said pressure transmitting member and the chamber in which it reciprocates having the form of an incomplete annulus, between the ends of which the strut passes.

6. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, either the rotating or non-rotating disks being lined with friction material, and actuating means for said brake arranged to exert pressure in an axial direction to move said disks into contact with one another, said actuating means comprising a cylinder and piston combination which is located at least partially in the vertical plane of the lower end of the strut, and which has the form of an incomplete annulus left open at the top to provide space for the strut, the lining being absent from the otherwise lined disks at this point to permit a cooling flow of air over the surfaces of the disks.

7. In an aircraft landing gear including a substantially upright strut, a horizontally extending axle supported at the lower end of said strut, and a wheel mounted on said axle at one side of the strut, a brake mounted on the inboard side of the wheel comprising a plurality of disks, one or more of which rotate with the wheel, and one or more of which are non-rotatable, and actuating means for said brake arranged to exert pressure in an axial direction to move said disks into contact with one another, said actuating means comprising a cylinder and piston combination which is located at least partially in the vertical plane of the lower end of the strut, and which has the form of an incomplete annulus left open at the top to provide space for the strut.

8. In an aircraft landing gear including a strut, a horizontally extending axle supported at the lower end of said strut, a wheel mounted on said axle at one side of the strut, and a disk brake mounted on the inboard side of the wheel, actuating means for said brake located at least partially in the vertical plane of the lower end of the strut and having the form of an incomplete annulus left open at one side to provide space for said strut.

9. A brake comprising a plurality of disks, one or more of which are capable of rotating, and one or more of which are non-rotatable, the non-rotatable disks being lined with friction material, an axially movable pressure transmitting member arranged to act against said disks, a fixed housing member providing a chamber in which said pressure transmitting member reciprocates, the chamber having an opening to receive fluid under pressure to act against the pressure transmitting member, said pressure transmitting member and the chamber in which it reciprocates having the form of an incomplete annulus provided with an enlarged cylindrical portion at each end, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber, said seal having a continuous lip extending along the outer wall of the chamber, around the wall of each enlarged end portion, and along the inner wall of the chamber, the friction material lining being absent from the portion of the otherwise lined disks located between the ends of the pressure transmitting member, thereby permitting a cooling flow of air over the surfaces of the rotating disks at this point.

10. A brake comprising a plurality of disks, one or more of which are capable of rotating, and one or more of which are non-rotatable, an axially movable pressure transmitting member arranged to act against said disks, a fixed housing member providing a chamber in which said pressure transmitting member reciprocates, said pressure transmitting member and the chamber in which it reciprocates having the form of an incomplete annulus provided with an enlarged cylindrical portion at each end, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber, said seal having a continuous lip extending along the outer wall of the chamber, around the wall of each enlarged end portion, and along the inner wall of the chamber.

11. A brake comprising a plurality of disks, one or more of which are capable of rotating, and one or more of which are non-rotatable, an axially movable pressure transmitting member arranged to act against said disks, a fixed housing member providing a chamber in which said pressure transmitting member reciprocates, said pressure transmitting member and the chamber in which it reciprocates having the form of an incomplete annulus provided with an enlarged cylindrical portion at each end, a sealing member located in the chamber against the face of the pressure transmitting member to prevent the escape of fluid past said member, said sealing member being shaped to conform to the chamber and being retained against circumferential movement by the fit of its enlarged end portions in the enlarged ends of the chamber.

12. A brake comprising a plurality of disks, one or more of which are capable of rotating, and one or more of which are non-rotatable, an axially movable pressure transmitting member arranged to act against said disks and having the form of an incomplete annulus provided with an enlarged cylindrical portion at each end, and a fixed housing member providing a chamber in which said pressure transmitting member reciprocates, said chamber also having the form of an incomplete annulus provided with an enlarged cylindrical portion at each end.

13. A brake comprising a plurality of disks, one or more of which are capable of rotating, and one or more of which are non-rotatable, an axially movable pressure transmitting member arranged to act against said disks and having the form on an incomplete annulus, and a fixed housing member providing a chamber in which said pressure transmitting member reciprocates, said chamber also having the form of an incomplete annulus.

14. A brake comprising a plurality of disks, one or more of which are capable of rotating, and one or more of which are non-rotatable, either the rotating or non-rotating disks being lined with friction material, and actuating means arranged to exert pressure in an axial direction to move said disks into contact with one another, said actuating means comprising a cylinder and piston combination which has the form of an incomplete annulus left open at one side, the lining being absent from the otherwise lined disks at this point to permit a cooling flow of air over the surfaces of the disks.

15. A brake comprising a plurality of disks, one or more of which are capable of rotating, and one or more of which are non-rotatable, and actuating means, arranged to exert pressure in an axial direction to move said disks into contact with one another, constituted by a cylinder and piston combination which has the form of an incomplete annulus left open at one side.

WILLIAM H. DU BOIS.
IRVING F. CHAPIN.

REFERENCES CITED

The following references are of record in the file of this patent:

UNITED STATES PATENTS

| Number | Name | Date |
| --- | --- | --- |
| 534,977 | Sperry | Feb. 26, 1895 |
| 2,017,715 | Goodyear et al. | Oct. 15, 1935 |
| 2,068,956 | La Brie | Jan. 26, 1937 |
| 2,376,828 | Sneed | May 22, 1945 |
| 2,423,011 | Du Bois | June 24, 1947 |

FOREIGN PATENTS

| Number | Country | Date |
| --- | --- | --- |
| 310,320 | Italy | Aug. 9, 1933 |